(12) United States Patent
Horn

(10) Patent No.: US 8,270,550 B2
(45) Date of Patent: Sep. 18, 2012

(54) METHODS AND APPARATUS FOR EFFICIENTLY SYNCHRONIZING A TRANSMITTER AND A RECEIVER IN A COMMUNICATION SYSTEM

(75) Inventor: Gavin Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 11/182,294

(22) Filed: Jul. 15, 2005

(65) Prior Publication Data

US 2006/0133554 A1    Jun. 22, 2006

Related U.S. Application Data

(60) Provisional application No. 60/639,008, filed on Dec. 22, 2004, provisional application No. 60/664,695, filed on May 10, 2005.

(51) Int. Cl.
*H04L 7/00* (2006.01)

(52) U.S. Cl. ........ 375/354; 375/293; 375/365; 375/368; 370/469

(58) Field of Classification Search .................... 375/354
See application file for complete search history.

(56) References Cited

U.S. PATENT DOCUMENTS

| | | | | |
|---|---|---|---|---|
| 5,191,610 A | * | 3/1993 | Hill et al. | 380/262 |
| 6,519,301 B1 | * | 2/2003 | Rowell | 375/354 |
| 2001/0029188 A1 | * | 10/2001 | Sarkkinen et al. | 455/517 |
| 2003/0016698 A1 | * | 1/2003 | Chang et al. | 370/469 |
| 2005/0238058 A1 | * | 10/2005 | Peirce et al. | 370/503 |

* cited by examiner

*Primary Examiner* — Lihong Yu
(74) *Attorney, Agent, or Firm* — Abdollah Katbab; Howard H. Seo

(57) ABSTRACT

The disclosed embodiments provide methods and systems for synchronizing a transmitter and a receiver. In one embodiment, a method for synchronizing a transmitter and a receiver includes the transmitter performing a reset operation, and the receiver responding by performing a reset operation. In another embodiment, a method for synchronizing a transmitter and a receiver includes the receiver performing a reset operation, and the transmitter responding by performing a reset operation. The reset indicator includes toggling a reset indicator.

28 Claims, 10 Drawing Sheets

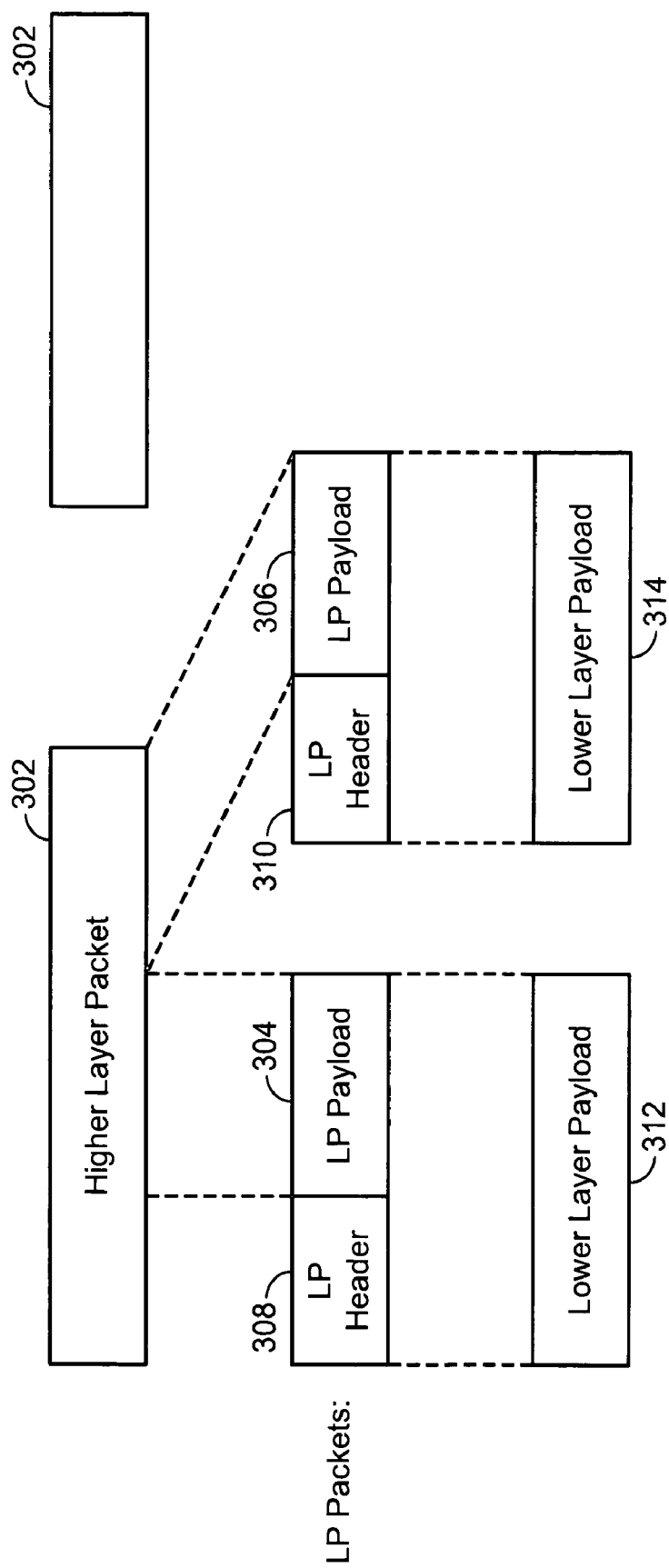

METHODS AND APPARATUS FOR EFFICIENTLY SYNCHRONIZING A TRANSMITTER AND A RECEIVER IN A COMMUNICATION SYSTEM

CLAIM OF PRIORITY UNDER 35 U.S.C. §119

The present Application for Patent claims priority to Provisional Application No. 60/639,008 entitled "METHODS AND APPARATUS FOR EFFICIENTLY SYNCHRONIZING A TRANSMITTER AND A RECEIVER IN A COMMUNICATION SYSTEM" filed Dec. 22, 2004, and Provisional Application No. 60/664,695 entitled "METHODS AND APPARATUS FOR EFFICIENTLY SYNCHRONIZING A TRANSMITTER AND A RECEIVER IN A COMMUNICATION SYSTEM" filed May 10, 2005, and assigned to the assignee hereof and hereby expressly incorporated by reference herein.

BACKGROUND

I. Field

The present invention relates generally to communications, and more specifically to methods and apparatus for efficiently synchronizing a transmitter and a receiver in a wireless communication system.

II. Background

Wireless communication systems are widely deployed to provide various communication services such as voice, packet data, and so on. These systems may be multiple-access systems capable of supporting communication with multiple users by sharing the available system resources. Examples of such multiple-access systems include Code Division Multiple Access (CDMA) systems, Multiple Carrier CDMA (MC-CDMA) systems, Time Division Multiple Access (TDMA) systems, Frequency Division Multiple Access (FDMA) systems, Orthogonal Frequency Division Multiple Access (OFDMA) systems, and so on.

Many wireless communication systems employ a link protocol (LP) above a physical layer to provide fragmentation and reassembly for transmission of data and signaling packets. For example, a physical layer may transmit data and signaling over the air in units of 128 bytes, while the packets to be transmitted may be of varying sizes such as 40, and 1500 bytes.

The LP supports fragmentation of the packets at the transmitter and reassembly of the packets at the receiver. The LP may also include mechanisms for re-transmission in order to achieve a higher reliability than the physical layer can achieve alone. The LP transmitter performs fragmentation of packets and signaling sent over the air. The LP receiver performs reassembly of the received data. In order to correctly reassemble the packets, the LP transmitter and LP receiver may need to be synchronized.

There is therefore a need in the art for methods and apparatus for efficiently synchronizing a LP transmitter with a LP receiver in a wireless communication system.

SUMMARY

The disclosed embodiments provide methods and systems for synchronizing a transmitter and a receiver. In an aspect, a method for synchronizing a transmitter and a receiver includes the transmitter performing a reset operation, and the receiver responding by performing a reset operation. In another aspect, a method for synchronizing a transmitter and a receiver includes the receiver performing a reset operation, and the transmitter responding by performing a reset operation.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 3 shows an exemplary frame format for fragmentation of higher layer packets;

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

Figure 1:
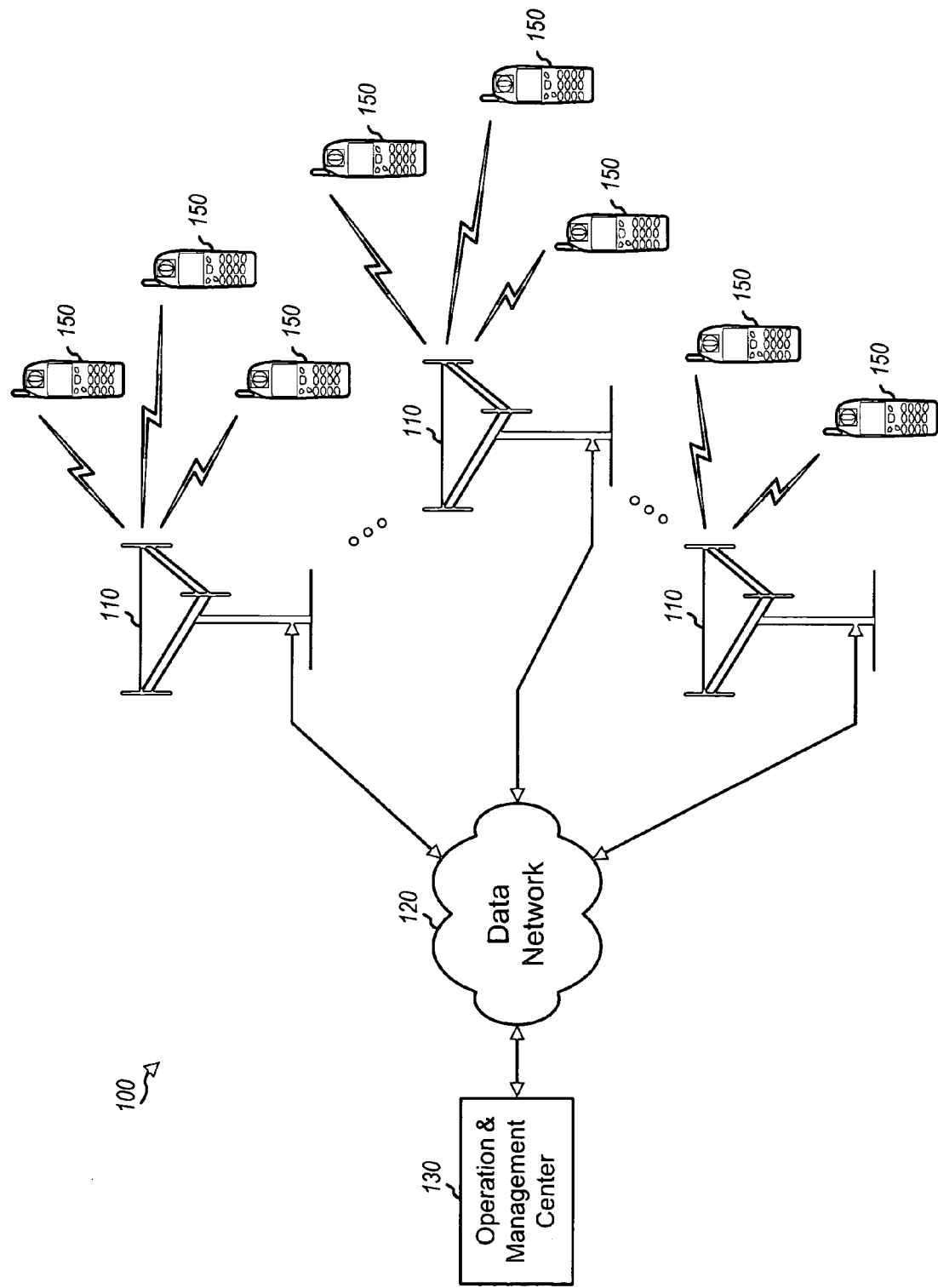
FIG. 1 shows a communication network.

FIG. 1 shows a wireless communication network 100 wherein the described embodiments may be employed. Network 100 includes access points 110 that support communication for access terminals 150. An access point (AP) is a fixed station used for communicating with the access terminals and may also be called a base station, a base transceiver system (BTS), a node B, or some other terminology. An access terminal (AT) may be fixed or mobile and may also be called a mobile station, a user equipment (UE), a wireless device, a handset, or some other terminology. Each access terminal may communicate with one or multiple access points on the forward link and/or reverse link at any given moment. The forward link (FL) refers to the communication link from the access points to the access terminals, and the reverse link (RL) refers to the communication link from the access terminals to the access points. The access points further communicate with an operation and management (O&M) center 130 via a data network 120 (e.g., the Internet). O&M center 130 performs a number of functions such as, for example, authentication and authorization of the access terminals, accounting, billing, and so on.

Figure 2:
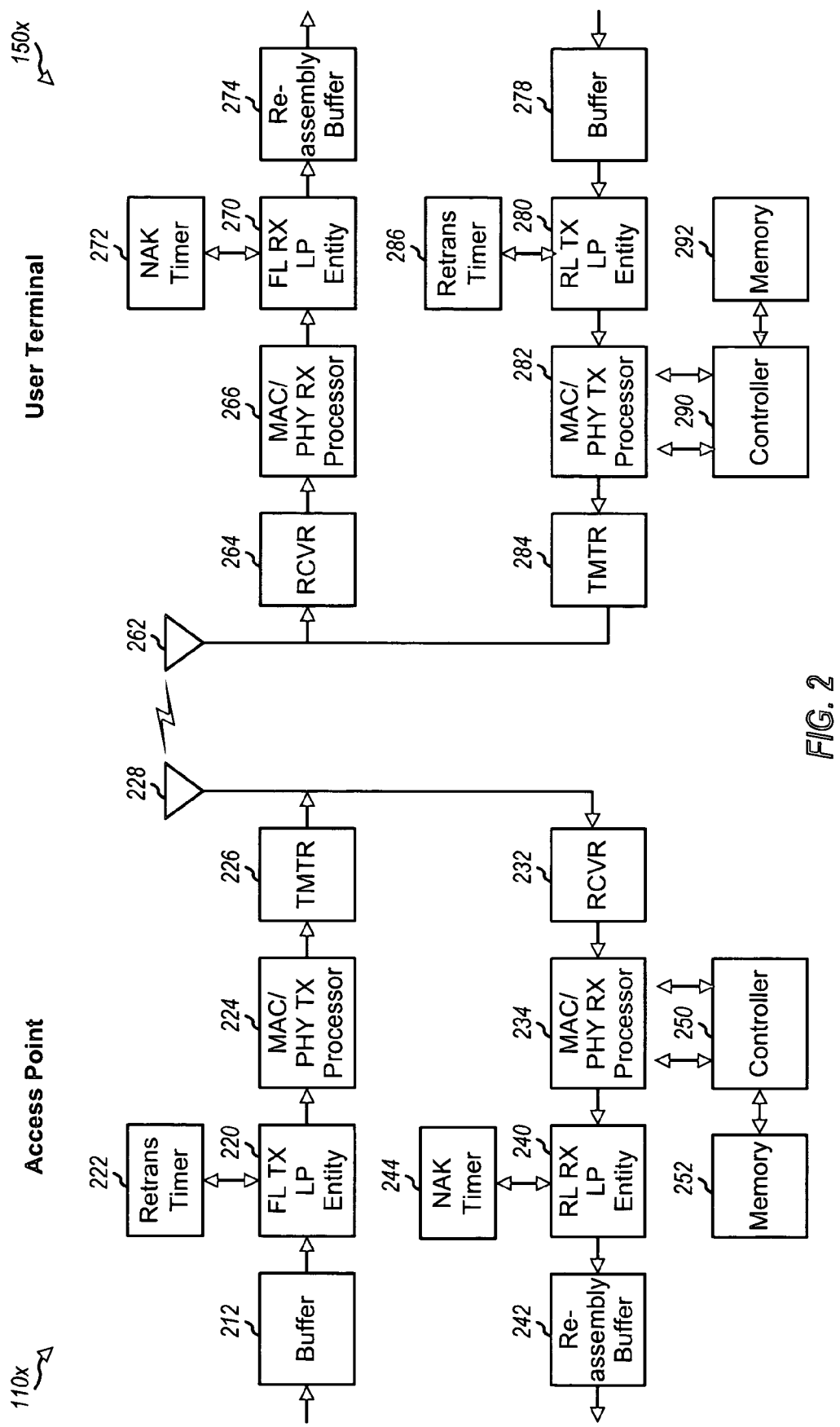
FIG. 2 shows a block diagram of an access point and an access terminal.

FIG. 2 shows a block diagram of an embodiment of an access point 110x and an access terminal 150x, which embody an access point and an access terminal, respectively, in wireless network 100 in FIG. 1. An FL facilitates data and signaling transmission from access point 110x to access terminal 150x. An RL facilitates data and signaling transmission from access terminal 150x to access point 110x. For clarity, the following description is for data transmission, although the description also generally applies to signaling.

For forward link data transmission, at access point 110x, a buffer 212 receives and stores data packets from higher layer applications. Higher layer applications may provide packets on different streams. For example, each higher layer application may be sent as a separate packet stream, or grouped into packet streams according to the quality of service (QoS) requirements of each application. Alternatively, a higher layer application may be a byte stream. For clarity, the following description is for packet streams, although the description also generally applies to byte streams. A link protocol (LP) processes each packet stream and provides a corresponding LP flow containing LP frames. The LP frames for all LP flows are multiplexed into LP protocol data units (PDUs), which are sent in one LP stream.

An FL TX LP entity 220 performs processing on the data packets in buffer 212 and provides a frame sequence containing frames. A MAC/PHY TX processor 224 performs forward link MAC and physical layer processing (e.g., multiplexing, encoding, modulation, scrambling, channelization, and so on) on the frame sequence from entity 220 and provides a stream of data samples. A transmitter unit (TMTR) 226 processes (e.g., converts to analog, amplifies, filters, and frequency up converts) the data sample stream from processor 224 and generates a forward link signal, which is transmitted via an antenna 228.

At access terminal 150x, the forward link signal from access point 110x is received by antenna 262 and processed (e.g., filtered, amplified, frequency downconverted, and digitized) by a receiver unit (RCVR) 264 to obtain received samples. A MAC/PHY RX processor 266 performs forward link MAC and physical layer processing (e.g., dechannelization, descrambling, demodulation, decoding, demultiplexing, and so on) on the received samples and provides a received frame sequence. An FL RX LP entity 270 performs receiver processing on the received frame sequence and provides decoded data to a re-assembly buffer 274. FL RX LP entity 270 may also generate NAKs for data detected to be missing and may also generate ACKs for data correctly decoded. The NAKs and ACKs are sent via the reverse link to access point 110x and provided to FL TX LP entity 220, which performs retransmission of the missing data if any. A retransmit timer 222 facilitates retransmission of the last frame to flush out the buffer. A NAK timer 272 facilitates retransmission of NAKs. These timers are described below.

For reverse link data transmission, at access terminal 150x, a buffer 278 receives and stores data packets from higher layer applications. An RL TX LP entity 280 performs processing on the data packets in buffer 278 and provides a frame sequence containing frames. A MAC/PHY TX processor 282 performs reverse link MAC and physical layer processing on the frame sequence from entity 280 and provides a stream of data samples. A transmitter unit (TMTR) 284 processes the data sample stream from processor 282 and generates a reverse link signal, which is transmitted via antenna 262.

At access point 110x, the reverse link signal from access terminal 150x is received by antenna 228 and processed by a receiver unit (RCVR) 232 to obtain received samples. A MAC/PHY RX processor 234 performs reverse link MAC and physical layer processing on the received samples and provides received frame sequence. An RL RX LP entity 240 performs receiver processing on the received frame sequence and provides decoded data to a re-assembly buffer 242. FL RX LP entity 240 may also generate NAKs for data detected to be missing and may also generate ACKs for data correctly decoded. The NAKs and ACKs are sent via the forward link to access terminal 150x and provided to RL TX LP entity 280, which performs retransmission of the missing data if any. The FL and RL are described in detail below. In general, ACK and/or NAK feedback may be sent by a link protocol (LP), and ACK and/or NAK feedback may also be sent by the physical layer.

Controllers 250 and 290 direct operation at access point 110x and access terminal 150x, respectively. Memory units 252 and 292 store program codes and data by controllers 250 and 290, respectively, for implementing the disclosed embodiments.

Access point 110x may transmit data to one or multiple access terminals simultaneously on the forward link. Access terminal 150x may transmit the same data to one or multiple access points on the reverse link. The following description is for forward link data transmission from access point 110x to access terminal 150x and for reverse link data transmission from access terminal 150x to access point 110x.

For clarity in the following description, TX LP entity is used to describe both the forward and reverse link TX LP entity for an LP flow and RX LP entity is used to describe both the forward and reverse link RX LP entity for an LP flow. In another embodiment forward and reverse link LP procedures may be asymmetric or different TX LP entities and RX LP entities may be used for different flows. For example, a flow requiring low latency may not allow retransmissions since the retransmitted data will not arrive in time, whereas a high latency flow may allow multiple retransmissions.

Transmit Procedure

FIG. 3 shows an embodiment for higher-layer information fragmentation and/or segmentation into lower layer payloads. A higher layer packet of information 302 may be fragmented into smaller-portion payloads 304, 306. Payloads 304, 306 may be augmented with LP headers 308, 310, respectively, to generate LP packets which may be transmitted and/or received as lower layer payloads 312, 314. In one embodiment, the LP header includes a sequence number that identifies a data unit in the LP payload. For clarity in the following description, a data unit is used to describe an octet, a frame, a packet, or some other unit of data that is associated with a sequence number. The sequence numbering for each packet data stream is independent of the sequence numbering for all other packet data streams. The sequence number allows for acknowledgment and retransmission of each data unit in each packet data stream. The sequence number falls within a range of 0 to $2^L-1$, where L is the number of bits used for the sequence number in the LP header. The sequence numbering starts from 0, goes to $2^L-1$, then wraps around to 0 and continues.

For clarity, in the following description, data from the higher layers is referred to as higher layer packets, or simply "packets", and data for LP flows is referred to as LP frames, or simply "frames". There is no defined relationship between LP frames and higher layer packets. A higher layer packet may span multiple LP frames, and an LP frame may carry multiple (whole or partial) higher layer packets. The LP layer may send both packet data frames and signaling data frames. An LP protocol data unit (PDU) may contain LP frames from one or multiple LP flows. Additionally, an LP PDU may contain LP frames from multiple different users, referred to as a multi-user LP PDU. For simplicity, the processing by the MAC and physical layers is not described below. The LP frames may be considered as the data being transmitted over the air.

Figure 4A:
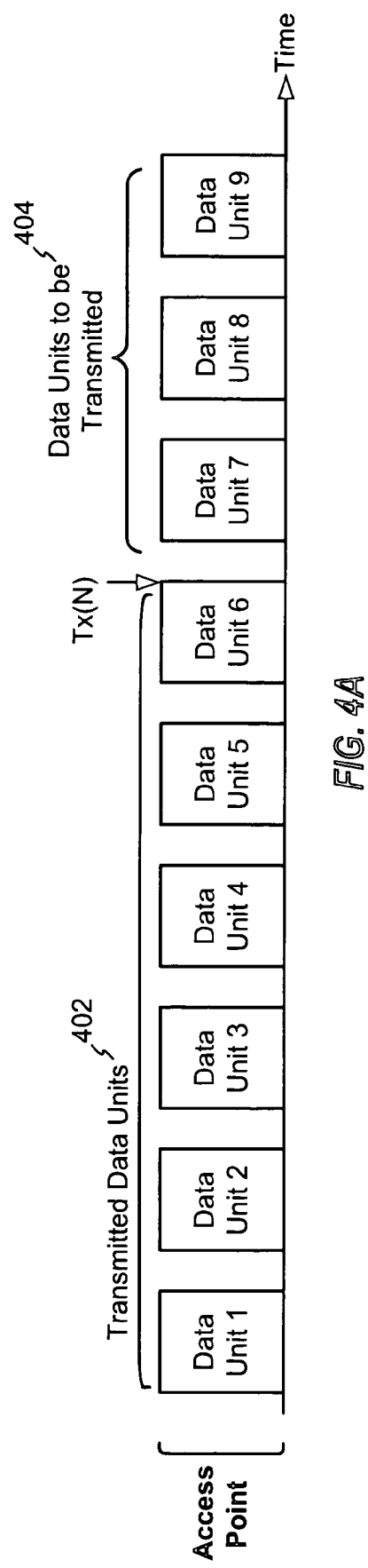
FIG. 4A shows a transmit data unit sequence.

FIG. 4A shows an exemplary data transmission on a link for a LP flow. The TX LP entity sequentially transmits LP data units 1, 2, 3, 4, 5 and 6 (402). LP data units 7, 8, and 9 (404) are the next new LP data units to be transmitted.

The LP data unit size may change from frame to frame but is known or can be detected by both the TX LP entity and RX LP entity (e.g., via signaling). For example, a RX LP entity that is expecting a frame may attempt to decode multiple hypotheses from a subset of combinations of allowed coding and modulation schemes and use a cyclic redundancy check (CRC) to determine if a valid frame was received.

Figure 4B:
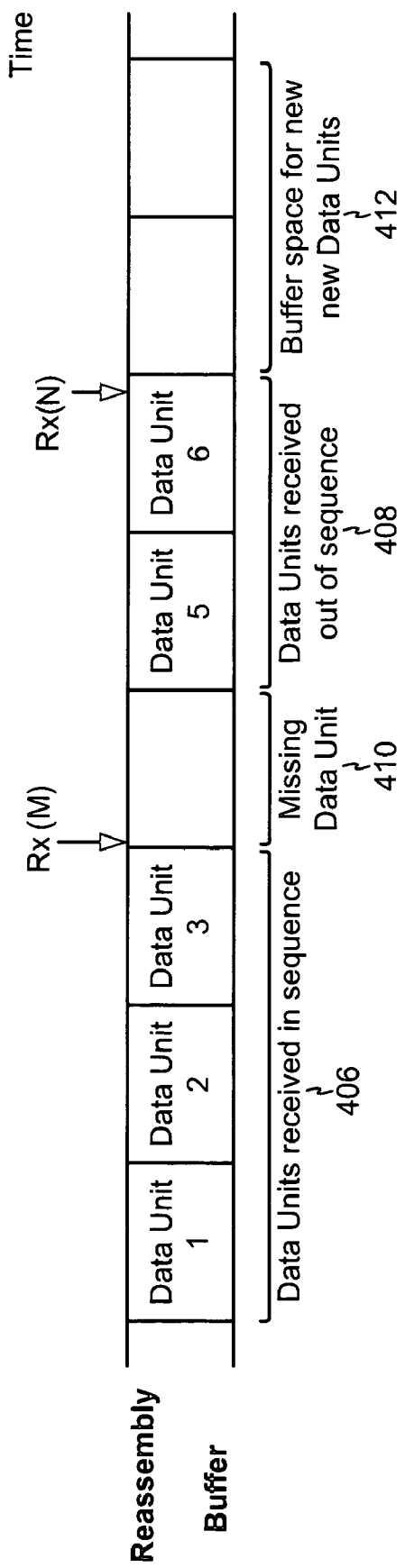
FIG. 4B shows a receive data unit sequence.

FIG. 4B shows the content of re-assembly buffer 274 at the RX LP entity after reception of LP data units. LP data units 1, 2, 3, 5, and 6 (406, 408) have been received correctly, with LP data unit 1 through 3 (406) being received in sequence and LP data units 5, and 6 (408) being received out of sequence. LP data unit 4 (410) is missing and represents a "hole" in the received data stream. LP data units (412) represent the next new LP data units to be received.

The TX LP entity typically does not know if or when data is received by the RX LP entity. The RX LP entity may detect holes or missing data on a LP flow whenever later data is received correctly on that flow. Several timers may be used to facilitate data transmission, as described below.

The TX LP entity may maintain the items listed in Table 1 for each LP flow to facilitate data transmission.

TABLE 1

TX LP entity State

| Item | Description |
| --- | --- |
| Tx(N) | Indicates the next octet of new data to be transmitted. |
| Sequence Number | Indicates the sequence number of the next data unit of new data to be transmitted. |
| Packet Buffer | Contains data packets for which no units have been sent. |
| Transmitted Buffer | Contains the current data packet being sent and the most recent data packets already sent (up to the transmitted buffer size). |
| Retransmission Buffer | Contains all LP data units that have been NAK'd by the receiver and not yet retransmitted. |
| Retransmit Timer | Timer used to retransmit data to indicate that there is no more data to send. |
| Retransmission Count Structure | Indicates the number of transmission attempts for each LP data unit. |
| $Q_{TX}$ | Indicates a new reset at the transmitter. |

Tx(N) indicates the next new data octet that has not been transmitted and may be considered as a pointer to the packet buffer, where "Tx" stands for transmitter and "N" stands for next. The L-bit variable Sequence Number indicates the sequence number of the next new data unit, e.g. one or more octets, that has not been transmitted. In one embodiment, the data units are octets and Tx(N) is equal to Sequence Number, as shown in FIG. 4A. Arithmetic operations and comparisons are performed on the sequence number using modulo-$2^L$ arithmetic.

Three "logical" buffers may be used for storing data with different states. The packet buffer stores incoming data packets from the higher layers. The transmitted buffer stores data packets that have been transmitted and may be retransmitted later. The retransmission buffer stores LP data units to be retransmitted. Data is logically moved among the buffers as described below. These buffers may be implemented with one or more "physical" buffers.

The retransmission count structure contains an entry for each LP data unit that is being transmitted or has been transmitted. The entry for each LP data unit indicates the number of transmissions for that LP data unit. In another embodiment, a retransmission count structure is not maintained at the TX LP entity. For example, the RX LP entity may only send a NAK for the earliest hole up to the maximum allowed number of retransmissions. When that hole is filled, the LP retransmission counter is reset. As another example, the TX LP entity may always retransmit a data unit that has been NAK'd if that data unit is still available in the buffer, or if the associated packet has not exceeded a maximum latency.

A retransmit timer is used to resend the last data in the packet buffer. When the last data unit in the three buffers has been transmitted, then the TX LP entity sets a retransmit timer. If no more data is received from the higher layers and the retransmit timer expires, then the TX LP entity may retransmit all or a portion of the last LP frame to allow the RX LP entity to detect whether the last LP frame is missing. If the TX LP entity only sends a portion of the last frame, then it sends the last portion of the frame, since in this case the RX LP entity may detect the missing beginning portion of the frame and request a retransmission. Sending a portion of the LP frame instead of the whole frame is usually more efficient since most LP frames are expected to be transmitted successfully. If the RX LP entity receives the retransmission of the last LP frame but did not receive the last LP frame, or the last several LP frames, then the RX LP entity may detect a hole for the last or last few LP frames and may then send a NAK for the missing LP data units. Similarly, the TX LP entity may use a retransmit timer to resend the data if no ACK is received before the retransmit timer expires.

Figure 5:
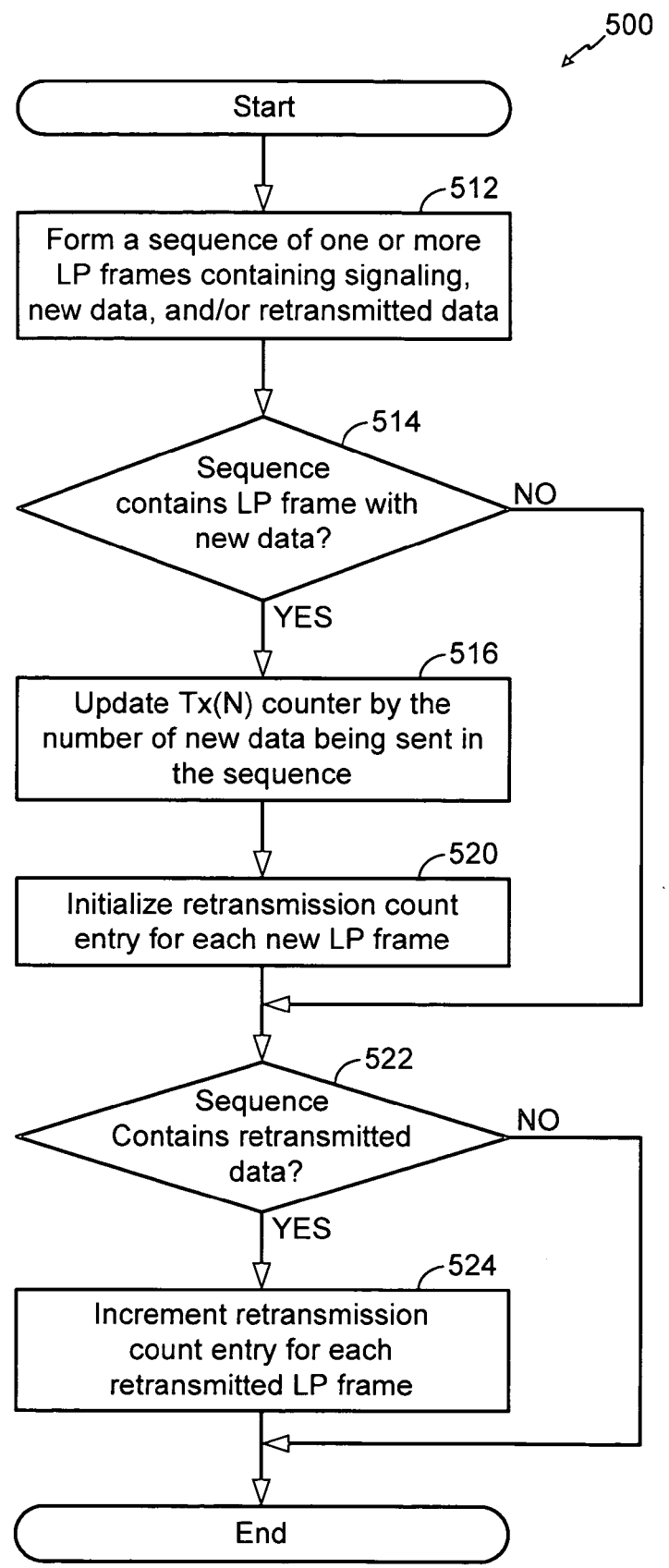
FIGS. 5 and 6 show processes performed by a transmitter for data and signaling transmission.

FIG. 5 shows one embodiment of a process 500 performed by the TX LP entity.

The TX LP entity forms a PDU of one or more LP frames containing signaling, new data, and/or retransmitted data for one or more LP flows (block 512). The PDU size may be determined by a MAC channel assignment. The PDU may be filled with data based on the QoS of the different LP flows and the priority order for each LP flow. The PDU may contain one or multiple LP frames, for example, one new LP frame, one retransmitted LP frame, one new LP frame plus one or more retransmitted LP frames, multiple new LP frames, multiple retransmitted LP frames, and so on. The retransmitted LP frame for each hole at the RX LP entity has its own header and can be identified by the RX LP entity. Each LP frame may contain an entire data packet, a portion of a data packet, or data for multiple packets. The TX LP entity forwards the PDU to the MAC layer for transmission to the RX LP entity.

The TX LP entity updates the state for each LP flow being sent in the PDU. For simplicity, the following description assumes that only one LP flow is being sent in the PDU.

If the LP frame contains new data (i.e., data transmitted for the first time), as determined in block 514, then the TX LP entity increments Tx(N) by the amount of new data being sent in the frame (block 516). The TX LP entity then initializes the entry in the retransmission count structure for each new LP data unit to '1' (block 520). If the LP frame does not contain any new data, then the TX LP skips blocks 516 through 520.

If the LP frame contains retransmitted data, as determined in block 522, then the TX LP entity increments the entry in the retransmission count structure for each data unit in the retransmitted LP frame (block 524). If the LP frame does not contain any retransmitted data, then the TX LP entity skips block 524.

Figure 6:
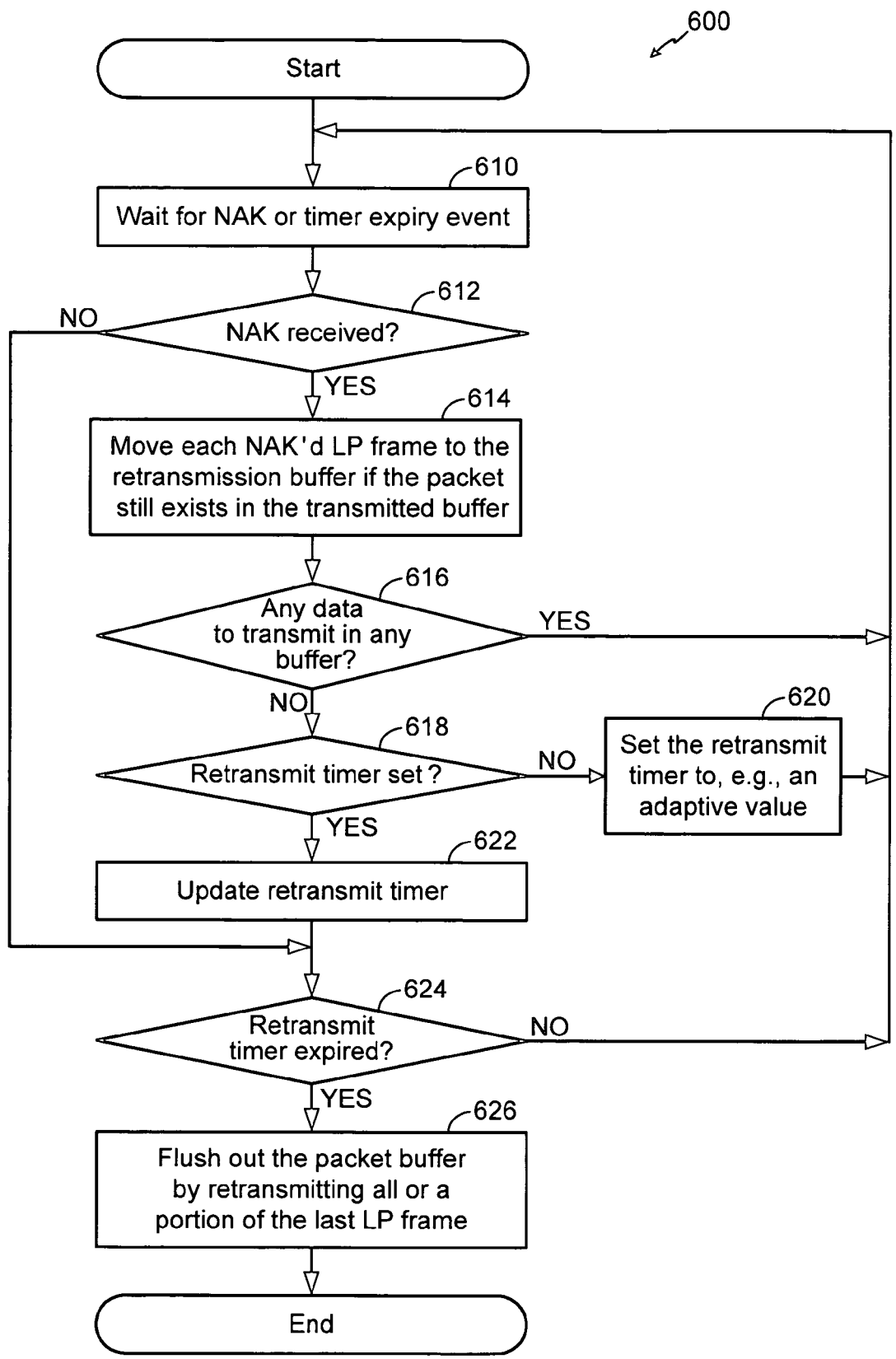

FIG. 6 shows one embodiment for a process 600 performed by the TX LP entity for data transmission. The TX LP entity waits for a NAK or a timer expiry event (block 610). If a NAK was received, as determined in block 612, then the TX LP entity (1) places each NAK'd LP data unit in the retransmission buffer if the LP data unit still exists in the transmitted buffer or (2) ignores the NAK'd LP data unit otherwise (block 614). The TX LP entity may perform a reset for a NAK'd LP data unit with a sequence number that is greater than the current Tx(N), since the requested data is either too old or has not been transmitted.

After block 614, the TX LP entity determines whether there is any data left to transmit in any of the three buffers (block 816). If the answer is 'Yes', then the TX LP entity returns to block 610. Otherwise, the TX LP entity determines whether the retransmit timer has been set (block 618). If the answer is 'No', then the TX LP entity sets the retransmit timer to an (adaptive) value (block 620) and then returns to block 610. Otherwise, if the retransmit timer has already been set, then the TX LP entity updates the retransmit timer (block 622). After block 622, and also if a NAK was not received in block 612, the TX LP entity determines whether the retransmit timer has expired (block 624). The TX LP entity flushes out the packet buffer if the retransmit timer has expired (block 626) and returns to block 610 otherwise.

The retransmit timer is used to retransmit all or a portion of the last LP frame.

This timer is set whenever the three buffers are emptied and there is no data to send and is deactivated whenever a new data packet is received from the higher layers. If the retransmit timer expires, then all or a portion of the last LP frame is retransmitted so that the RX LP entity may determine whether the last LP frame is missing.

Receive Procedure

The RX LP entity may maintain the items listed in Table 2 for each LP flow to facilitate data reception.

TABLE 2

RX LP entity State

| Item | Description |
| --- | --- |
| Rx(N) | Indicates the sequence number of the next data unit of new data expected to arrive. |
| Rx(M) | Indicates the sequence number of the first missing data unit of data in the reassembly buffer. |
| Reassembly Structure | Tracks the status of each data unit and indicates whether it is received or not. |
| Retransmission Count Structure | Indicates the number of NAKs sent for each missing data unit in the reassembly structure. |
| NAK Timer | Timer used to retransmit another NAK or forward data to the higher layers. |
| $Q_{RX}$ | Indicates a new reset at the receiver. |

The reassembly structure tracks the status of each data unit and may be used to detect missing data or holes. Each hole is a block of one or more contiguous data units that have not been received but have sequence numbers earlier than that of at least one data unit already received. Each hole may span any number of data units, e.g., one LP frame, multiple LP frames, or a partial LP frame, depending on the results of the data transmission and retransmission. The retransmission count structure contains an entry for each hole in the reassembly structure. The entry for each hole indicates the number of NAKs already sent for that hole. If the maximum number of NAKs has been sent and the missing data is still not received, then the RX LP entity assumes that this data will not be transmitted and may forward the data up to the next hole in the reassembly buffer to the higher layers as appropriate. Additionally, the RX LP entity may forward the data up to the next hole in the reassembly buffer to the higher layer based on a latency. In another embodiment, the RX LP entity may forward the data to the higher layer out of order, for example, each complete higher layer packet may be forwarded once it is reassembled.

The RX LP entity sends a NAK whenever a new hole is detected, the NAK timer expires, a predetermined number of LP data units have been received since the last NAK was sent, or some other criterion is satisfied. A new hole is detected if the RX LP entity receives a data unit with a sequence number greater than the next expected data unit. The NAK timer indicates when to send another NAK and may be set to an adaptive value. Each NAK sent by the RX LP entity includes information for all holes in the reassembly structure, e.g., the sequence number of the first data unit in the hole and the size of the hole. Whenever a new NAK is sent, the RX LP entity updates the entries in the retransmission count structure for all NAK'd holes and resets the NAK timer. In another embodiment, the RX LP entity sends an ACK for each received data unit. The ACK may be sent immediately upon reception of a data unit, after a certain time so that multiple ACKs can be aggregated, and so on.

The TX LP entity may retransmit data for an entire hole that has been NAK'd or only a portion of the NAK'd hole, e.g., if there is insufficient space in the LP frame to resend data for the entire hole. The TX LP entity may also retransmit data for multiple NAK'd holes as separate retransmitted LP frames in the same PDU. Because the TX LP entity may retransmit any portion of an LP frame, the RX LP entity may keep track of the status of each data unit instead of each LP frame.

The RX LP entity processes each received LP data unit, which may include one or more units of new data and/or retransmitted data. Each unit of data is identified by its sequence number, which may be determined based on (1) the sequence number for the LP data unit as indicated in the LP header and (2) the location of the unit of data within the LP data unit.

Figure 7:
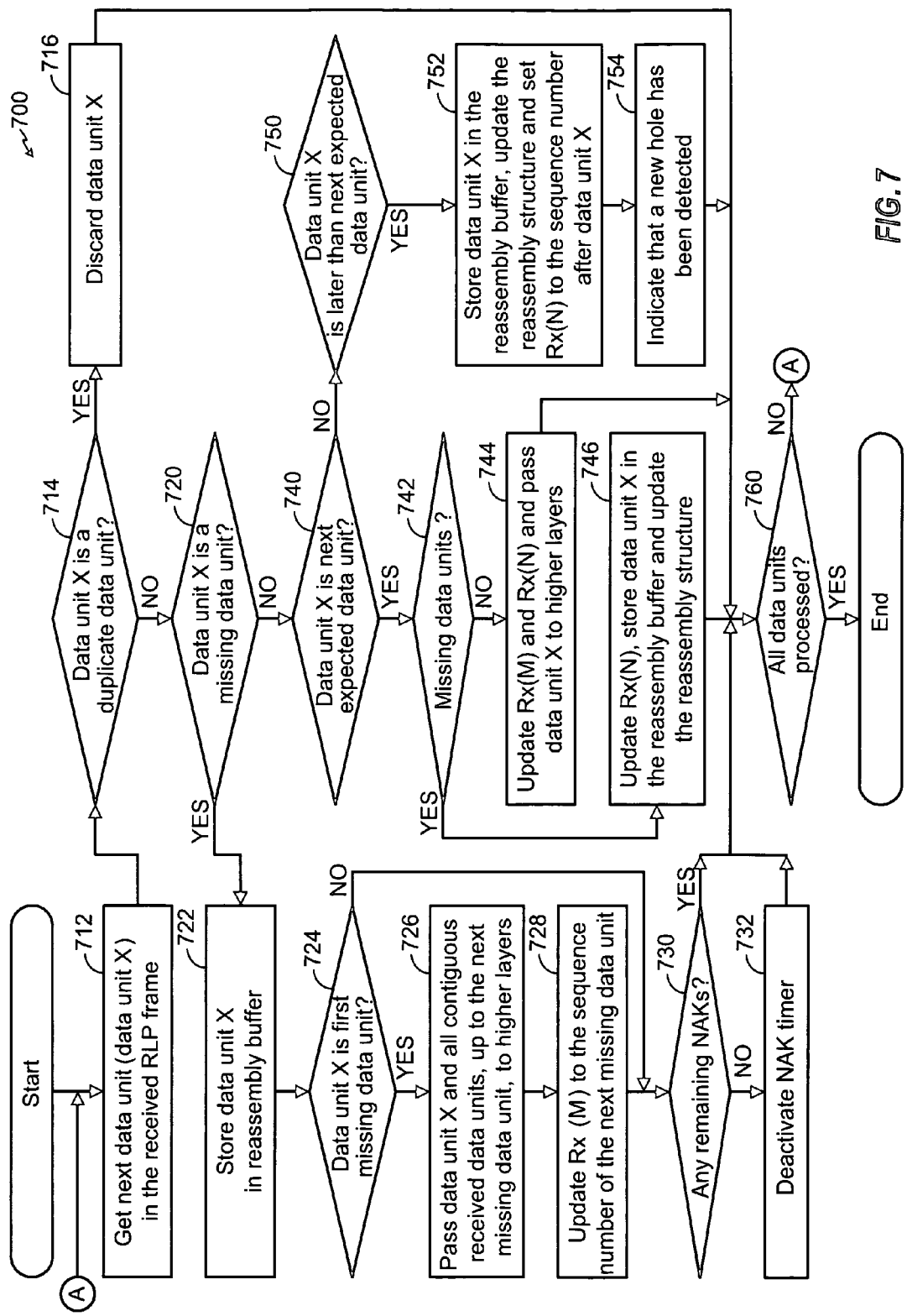
FIG. 7 shows processes performed by a receiver for data and signaling reception.

FIG. 7 shows one embodiment for a process 700 performed by the RX LP entity for each received LP frame. The RX LP entity initially gets the first data unit (called data unit X) in the received LP frame (block 712). The RX LP entity determines whether data unit X is a duplicate data unit (block 714). Data unit X is a duplicate data unit if it (1) has a sequence number smaller than that of the first missing data unit, i.e., X<Rx(M), or (2) has a sequence number between the sequence numbers of the first missing data unit and the next expected data unit, i.e., Rx(M)<X<Rx(N), but is already stored in the reassembly buffer. If data unit X is a duplicate data unit, then the RX LP entity discards data unit X (block 716) and proceeds to block 760.

If data unit X is not a duplicate data unit, as determined in block 714, then the RX LP entity determines whether data unit X is a missing data unit (block 720). Data unit X is a missing data unit if it has a sequence number between the sequence numbers of the first missing data unit and the next expected data unit, i.e., $Rx(M) \leq X < Rx(N)$, and is not already stored in the reassembly buffer. If data unit X is a missing data unit, then the RX LP entity stores data unit X in the reassembly buffer (block 722), updates the reassembly structure, and determines whether data unit X is the first missing data unit, i.e., whether $X=Rx(M)$ (block 724). If data unit X is the first missing data unit, then the RX LP entity forwards data unit X and all contiguous received data units, up to the next missing data unit, to the higher layers (block 726). The RX LP entity then removes the forwarded data units from the reassembly structure and updates $Rx(M)$ to the sequence number of the next missing data unit (block 728). After block 728 and also if the answer is 'No' for block 724, the RX LP entity determines whether there are any NAKs outstanding (block 730). If the answer is 'No' for block 730, then the RX LP entity deactivates the NAK timer (block 732). After block 732 and also if the answer is 'Yes' for block 730, the RX LP entity proceeds to block 760.

If data unit X is not a missing data unit, as determined in block 720, then the RX LP entity determines whether data unit X is the next expected data unit, i.e., whether $X=Rx(N)$ (block 740). If data unit X is the next expected data unit, then the RX LP entity determines whether there are missing data units, which is indicated by $Rx(M) < Rx(N)$ (block 742). If the answer is 'No' for block 742 and there are no missing data units, which is indicated by $Rx(M)=Rx(N)$, then the RX LP entity updates both $Rx(M)$ and $Rx(N)$ and forwards data unit X to the higher layers (block 742). Otherwise, if answer is 'Yes' for block 742 and there is at least one missing data unit, which is indicated by $Rx(M) < Rx(N)$, then the RX LP entity updates $Rx(N)$, stores data unit X in the reassembly buffer, and updates the reassembly structure (block 744). The RX LP entity then proceeds to block 760 from blocks 744 and 746.

If data unit X is not the next expected data unit, as determined in block 740, then the RX LP entity determines whether data unit X is a later data unit, i.e., whether $X > Rx(N)$ (block 750). If the answer is 'Yes', then the RX LP entity stores data unit X in the reassembly buffer, updates the reassembly structure, sets $Rx(N)$ to the sequence number after data unit X, i.e., $Rx(N)=X+1$ (block 752), indicates that a new hole has been detected (block 754), and then proceeds to block 760.

In block 760, the RX LP entity determines whether all data unit in the received LP frame have been processed. If the answer is 'No', then the RX LP entity returns to block 712 to process the next data unit in the received LP frame. Otherwise, the processing for the received LP frame terminates.

For the embodiment shown in FIG. 7, the RX LP entity delivers data in order to the higher layers. If any data is missing, then the RX LP entity waits for the retransmission of the missing data and delays sending any new data that arrives out of sequence to the higher layers until the missing data arrives.

Initialization and Reset Procedures

In one embodiment, the LP packet header includes a sequence number that identifies the data unit(s) in the LP payload. In one embodiment, the sequence number is represented by an L-bit sequence number, e.g., L=3 bits, for identifying a series of data units, e.g., eight data units. In this case, the sequence number variable wraps around, e.g., every eight data units, for identifying a series of data units. This may cause ambiguity in the transmit/receive processes; thus, the TX LP entity, the RX LP entity, or both, may reset themselves to stay synchronized.

In one embodiment, for a given sequence number S, the sequence numbers in the range of $S+1$ to $S+2^{L-1}-1$ are considered to be greater than S, and the sequence numbers in the range of $S-2^{L-1}$ to $S-1$ are considered to be smaller than S. Half of the total range is thus considered to be greater than S, and the other half of the total range is considered to be smaller than S. In one embodiment, if the TX LP entity receives an ACK/NAK message that correspond to a data unit with sequence number greater than S, the TX LP entity and RX LP entity may initialize and/or reset themselves to prevent any ambiguity in the transmit/receive processes. For example, the transmit process may define a window of outstanding data units between the TX LP entity and RX LP entity to be all those data units less than the sequence number S in the last frame that was transmitted. Any ACK/NAK message greater than S would be outside the window of outstanding data units and indicate that the TX LP entity and RX LP entity are no longer synchronized.

In one embodiment, an initialization procedure initializes the state variables and/or data structures in one end of the link, between a TX LP entity and a RX LP entity, and a reset procedure guarantees that state variables on both sides of the link are synchronized. The reset procedure may include initialization.

In one embodiment, the access terminal (AT) and the access network (AN) may perform the initialization and /or reset procedures, as defined below.

1. Initialization Procedures
1.1 Initialization Procedure by the TX LP Entity
According to one embodiment, a TX LP entity performs an initialization procedure as follows:
  Resets a send state variable, e.g., $Tx(N)$ as defined in Table 1, to zero, and/or
  Clears the retransmission buffer, and/or
  Clears the packet buffer and transmitted buffer
1.2 Initialization Procedure by the RX LP Entity
According to one embodiment, a RX LP entity performs the initialization procedure as follows:
  Resets at least two receive state variables e.g., $Rx(N)$ and $Rx(M)$, as defined in Table 2, to zero, and/or
  Clears the resequencing buffer.
2. Reset Procedures
2.1 Reset Procedure when the Initiating Side is a TX LP Entity In one embodiment, a reset indicator at the TX LP entity side (e.g., $Q_{TX}$) and at the RX LP entity side (e.g., $Q_{RX}$) may be used to signal a reset operation at the respective side. The TX LP entity toggles the reset indicator $Q_{TX}$ between '0' and '1' to indicate a reset. The value of the reset indicator $Q_{TX}$ is included in the LP header as a reset indicator field. The RX LP entity reset indicator $Q_{RX}$ tracks the value of $Q_{TX}$ using the reset indicator field, and detects when the TX LP entity has performed a reset.

Figure 8:
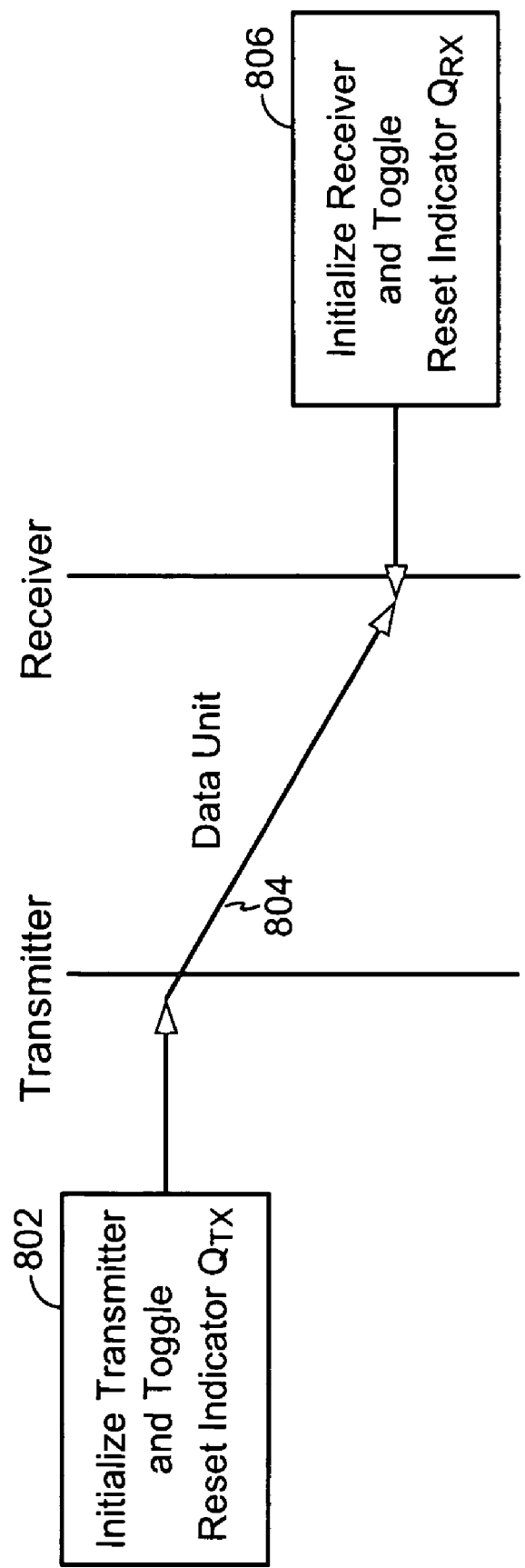
FIG. 8 shows one embodiment for a transmitter-indicated synchronization.

According to one embodiment, as shown in FIG. 8, when the side initiating a reset procedure is a TX LP entity, the TX LP entity may perform a reset operation, in act 802, as follows:
  Perform a TX LP entity initialization procedure, e.g., as defined above in Section 1.1, and
  Toggle the value of the reset indicator $Q_{TX}$.

In one embodiment, the ACK/NAK message sent by the RX LP entity includes a field with the current value of the reset indicator $Q_{RX}$ as a last reset indicator field and the TX LP entity may not reset again until it receives an ACK/NAK message with a last reset indicator field equal to the new value of the reset indicator $Q_{TX}$.

In one embodiment, the TX LP entity may ignore any received "ResetRequest" messages, indicating a request to reset the TX LP entity, from the RX LP entity until it receives an ACK/NAK message with a last reset indicator field equal to the new value of the reset indicator $Q_{TX}$.

2.2 Reset Procedure When the Responding Side is a RX LP Entity

In one embodiment, as shown in FIG. 8, upon receiving a data unit 804 with a reset indicator field not equal to the current RX LP entity's reset indicator $Q_{RX}$, the RX LP entity may perform a reset operation, in act 806, as follows:

Perform a RX LP entity initialization procedure, e.g. as defined above in Section 1.2, and Toggle the value of the reset indicator $Q_{RX}$.

2.3 Reset Procedure When the Initiating Side is a RX LP Entity

Figure 9:
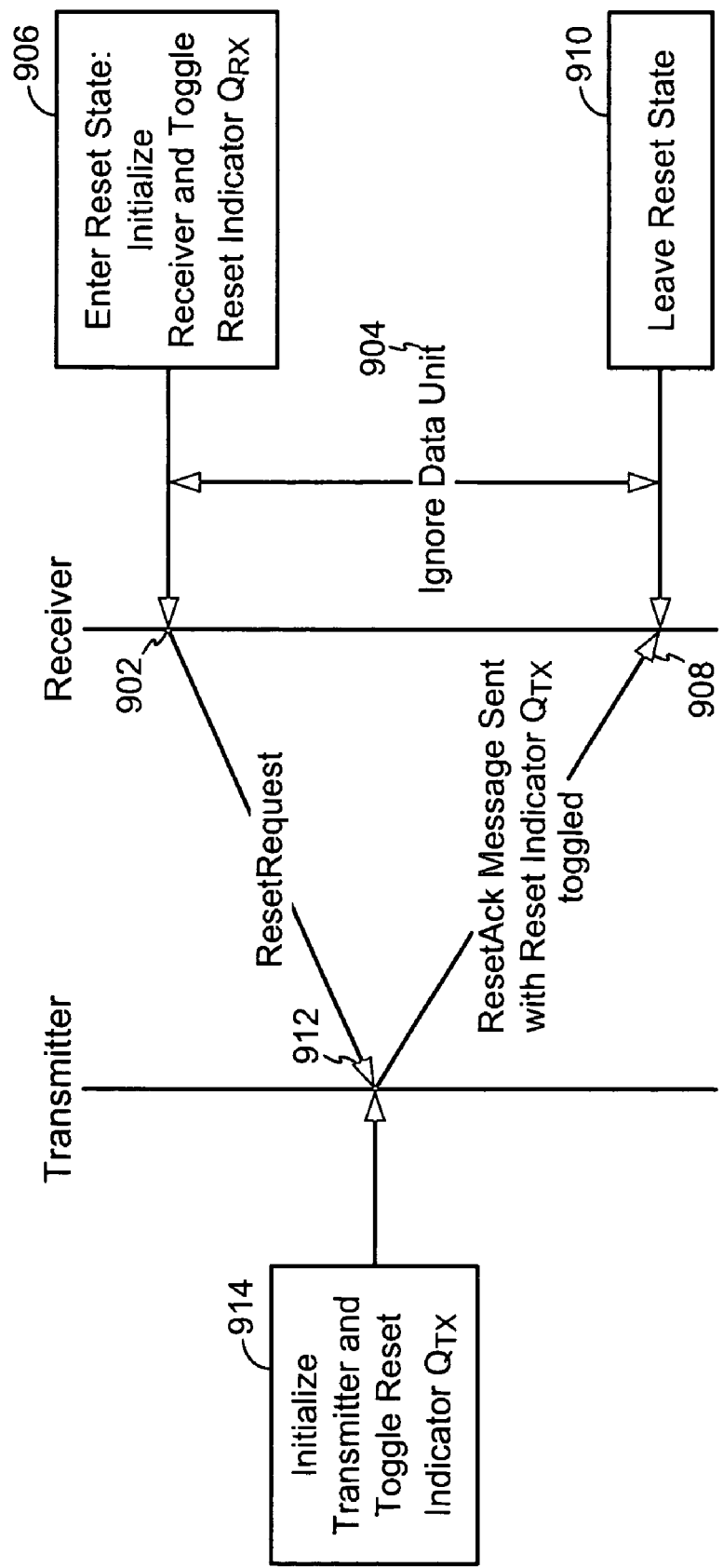
FIG. 9 shows one embodiment for a receiver-initiated synchronization.

According to one embodiment, as shown in FIG. 9, when the side initiating a reset procedure is a RX LP entity, then the RX LP entity may send a "ResetRequest" message, indicating a request to reset the TX LP entity, in act 902, and enter the Reset state 906.

Upon entering the Reset state 906, the RX LP entity may perform a reset operation, as follows:

Perform a RX LP entity initialization procedure, e.g., as defined above in Section 1.2, and Toggle the value of the reset indicator $Q_{RX}$.

In one embodiment, the RX LP entity may ignore all data units received while in the Reset state 906, as shown by 904, as far as their received reset indicator field is not equal to the value of the RX LP entity's reset indicator $Q_{RX}$. If a "ResetAck" message is received in acknowledgement of the "ResetRequest" message, or a data unit is received with a reset indicator field equal to the current value of the RX LP entity's reset indicator $Q_{RX}$, as shown by 908, RX LP entity may leave the Reset state 906, as shown by 910. If a "ResetAck" message is received while the RX LP entity is not in the Reset state 906, the message may be ignored.

2.4 Reset Procedure When the Responding Side is a TX LP Entity

In one embodiment, as shown in FIG. 9, when the side responding to a reset procedure is a TX LP entity, then upon receiving a "ResetRequest" message, as shown by 912, TX LP entity may check the validity of the message. If the message is valid, the TX LP entity may perform a reset operation, in act 914, as follows:

Perform a TX LP entity initialization procedure, e.g., as defined above in Section 1.1, Toggle the value of the reset indicator $Q_{TX}$, and/or Respond with a "ResetAck" message.

In one embodiment, the "ResetRequest" message includes a reset counter field that is initialized to zero and incremented each time a new "ResetRequest" message is sent. The TX LP entity checks if the "ResetRequest" message is a new message by checking if the reset counter field is greater than value of the last reset counter field in the last "ResetRequest" message received. In this embodiment, for example, a new message is valid and the TX LP entity performs the rest operation, and an old message is not valid and is ignored.

The embodiments described herein may be used for various link protocols, such as radio link protocol, (RLP), signaling link protocol (SLP), or any protocol that uses fragmentation and reassembly for transmitting higher level information via a lower layer payload.

The embodiments described herein may be used for various wireless communication networks including CDMA, MC-CDMA, TDMA, FDMA, and OFDMA networks. These LPs may be used for single-carrier and multi-carrier networks. Multiple carriers may be provided by orthogonal frequency division multiplexing (OFDM) or some other construct.

The embodiments designs described herein may be implemented by various means. For example, the transmitter and receiver may be implemented in hardware, software, or a combination thereof. For a hardware implementation, the entities may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmitter and receiver entities may be implemented with modules (e.g., procedures, functions, and so on) that perform the functions described herein. The software codes may be stored in a memory unit (e.g., memory unit 252 or 292 in FIG. 2) and executed by a processor (e.g., controller 250 or 290). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of synchronizing a transmitter (Tx) entity and a receiver (Rx) entity, wherein the Tx entity initiates a synchronization and the Rx entity responds to the synchronization, the method comprising:

with the Tx entity:
transmitting an initial plurality of frames to the Rx entity, each of the initial plurality of frames comprising a header having a Tx reset indicator field set to a first state as part of a previously conducted reset operation;
in response to a determination to perform a Tx entity reset operation:
performing the Tx entity reset operation; and
transmitting a subsequent plurality of frames to the Rx entity, each of the subsequent plurality of frames having the Tx reset indicator field in the header set to a second state to indicate that the Tx entity has performed the Tx entity reset operation; and with the Rx entity:
in response to identifying that the Tx reset indicator field in the header of a received frame in the subsequent plurality of frames changed from the first state to the second state:
performing an Rx entity reset operation; and
transmitting a reset acknowledge message comprising a Rx reset indicator to the Tx entity, the Rx reset indicator being set to indicate that the Rx entity has performed the Rx entity reset operation, wherein each of the initial plurality of frames and each of the subsequent plurality of frames further comprises data for use in one or more other operations.

2. The method of claim 1, wherein the Tx entity reset operation comprises performing a Tx entity initialization procedure comprising:
resetting a send state variable; and
clearing a retransmission buffer.

3. The method of claim 2, wherein the send state variable comprises information about a sequence number of a next data unit to be sent.

4. The method of claim 2, wherein the Rx entity reset operation comprises:
performing an Rx entity initialization procedure.

5. The method of claim 4, wherein the Rx entity initialization procedure comprises:
resetting at least two receive state variables; and
clearing a resequencing buffer.

6. The method of claim 5, wherein the receive state variables comprise a first receive state variable providing information indicating a sequence number of a next data unit of new data expected to arrive, and a second receive sate variable providing information indicating a sequence number of a first missing data unit.

7. A method of responding by a receiver (Rx) entity to a reset operation performed by a transmitter (Tx) entity, the method comprising:
receiving an initial plurality of frames from the Tx entity, each of the initial plurality of frames comprising a header having a Tx reset indicator field set to a first state as part of a previously conducted reset operation;
in response to identifying that the Tx reset indicator field in the header of a received frame in a subsequent plurality of frames is set to a second state, wherein the second state is indicative of the Tx entity having performed a Tx entity reset operation:
performing an Rx entity reset operation; and
transmitting a reset acknowledge message comprising a Rx reset indicator to the Tx entity, the Rx reset indicator being set to indicate that the Rx entity has performed the Rx entity reset operation, wherein each of the initial plurality of frames and each of the subsequent plurality of frames further comprises data for use in one or more other operations.

8. The method of claim 7, wherein the Rx entity reset operation comprises:
resetting at least two receive state variables; and
clearing a resequencing buffer.

9. The method of claim 8, wherein the receive state variables comprise a first receive state variable providing information indicating a sequence number of a next data unit of new data expected to arrive, and a second receive sate variable providing information indicating a sequence number of a first missing data unit.

10. A method of resetting a receiver (Rx) entity, the method comprising:
receiving an initial plurality of frames from a transmitter (Tx) entity, each of the initial plurality of frames comprising a header having a Tx reset indicator field set to a first state as part of a previously conducted reset operation;
in response to a determination to perform a Rx entity reset operation:
performing an Rx entity reset operation;
transmitting a reset request message comprising a Rx reset indicator to the Tx entity, the Rx reset indicator being set to indicate that the Rx entity has performed the Rx entity reset operation; and
receiving a subsequent plurality of frames from the Tx entity, each of the subsequent plurality of frames having the Tx reset indicator field in the header set to a second state indicating that the Tx entity performed a Tx entity reset operation, wherein each of the initial plurality of frames and each of the subsequent plurality of frames further comprises data for use in one or more other operations.

11. The method of claim 10, wherein the Rx entity reset operation comprises:
resetting at least two receive state variables; and
clearing a resequencing buffer.

12. The method of claim 11, wherein the receive state variables comprise a first receive state variable providing information indicating a sequence number of a next data unit of new data expected to arrive, and a second receive sate variable providing information indicating a sequence number of a first missing data unit.

13. A method of responding by a transmitter (Tx) entity to a reset operation performed by a receiver (Rx) entity, the method comprising:
transmitting an initial plurality of frames to the Rx entity, each of the initial plurality of frames comprising a header having a Tx reset indicator field set to a first state as part of a previously conducted reset operation;
in response to receiving a reset request message comprising a Rx reset indicator set to indicate that the Rx entity has performed a Rx entity reset operation:
performing a Tx entity reset operation; and
transmitting a subsequent plurality of frames to the Rx entity, each of the subsequent plurality of frames having the Tx reset indicator field in the header set to a second state to indicate that the Tx entity has performed the Tx entity reset operation, wherein each of the initial plurality of frames and each of the subsequent plurality of frames further comprises data for use in one or more other operations.

14. The method of claim 13, wherein the Tx entity reset operation comprises:
resetting a send state variable; and
clearing a retransmission buffer.

15. The method of claim 14, wherein the send state variable comprises information about a sequence number of a next data unit to be sent.

16. An apparatus for responding by a receiver (Rx) entity to a reset operation performed by a transmitter (Tx) entity, comprising:
means for receiving an initial plurality of frames from the Tx entity, each of the initial plurality of frames comprising a header having a Tx reset indicator field set to a first state as part of a previously conducted reset operation;
means for receiving a subsequent plurality of frames from the Tx entity, each of the subsequent plurality of frames comprising the header;
means for identifying that the Tx reset indicator field in the header of a received frame in the subsequent plurality of frames is set to a second state, wherein the second state is indicative of the Tx entity having performed a Tx entity reset operation;
means for performing an Rx entity reset operation, in response to identifying the Tx entity has performed the Tx entity reset operation; and
means for transmitting a reset acknowledge message comprising a Rx reset indicator to the Tx entity, the Rx reset indicator being set to indicate that the Rx entity has performed the Rx entity reset operation, wherein each of the initial plurality of frames and each of the subsequent plurality of frames further comprises data for use in one or more other operations.

17. An apparatus for responding by a transmitter (Tx) entity to a reset operation performed by a receiver (Rx) entity, comprising:
    means for transmitting an initial plurality of frames to the Rx entity, each of the initial plurality of frames comprising a header having a Tx reset indicator field set to a first state as part of a previously conducted reset operation;
    means for receiving a reset request message from the Rx entity, the reset request message comprising a Rx reset indicator set to indicate that the Rx entity has performed a Rx entity reset operation;
    means for performing a Tx entity reset operation, in response to the Rx reset indicator being set to indicate that the Rx entity has performed the Rx entity reset operation; and
    means for transmitting a subsequent plurality of frames to the Rx entity, each of the subsequent plurality of frames having the Tx reset indicator field in the header set to a second state to indicate that the Tx entity has performed the Tx entity reset operation, wherein each of the initial plurality of frames and each of the subsequent plurality of frames further comprises data for use in one or more other operations.

18. An article comprising:
    a non-transitory computer-program product having code instructions stored thereon that are executable by a processor of a receiver (Rx) entity to:
        obtain an initial plurality of frames received from a transmitter (Tx) entity, each of the initial plurality of frames comprising a header having a Tx reset indicator field set to a first state as part of a previously conducted reset operation;
        obtain a subsequent plurality of frames from the Tx entity, each of the subsequent plurality of frames comprising the header;
        in response to identifying that the Tx reset indicator field in the header of a received frame in the subsequent plurality of frames is set to a second state, wherein the second state is indicative of the Tx entity having performed a Tx entity reset operation:
            initiate a Rx entity reset operation; and
            in response to performing the Rx entity reset operation, initiate transmission, to the Tx entity, of a reset acknowledge message comprising a Rx reset indicator that is set to indicate that the Rx entity has performed the Rx entity reset operation, wherein each of the initial plurality of frames and each of the subsequent plurality of frames further comprises data for use in one or more other operations.

19. An article comprising:
    a non-transitory computer-program product having code instructions stored thereon that are executable by a processor of a transmitter (Tx) entity to:
        initiate transmission of an initial plurality of frames to a receiver (Rx) entity, each of the plurality of frames comprising a header having a Tx reset indicator field set to a first state as part of a previously conducted reset operation;
        in response to receiving a reset request message from the Rx entity, the reset request message comprising a Rx reset indicator set to indicate that the Rx entity has performed a Rx entity reset operation:
            initiate a Tx entity reset operation; and
            initiate transmission of a subsequent plurality of frames to the Rx entity, each of the subsequent plurality of frames having the Tx reset indicator field in the header set to a second state to indicate that the Tx entity has performed the Tx entity reset operation, wherein each of the initial plurality of frames and each of the subsequent plurality of frames further comprises data for use in one or more other operations.

20. An apparatus for use in resetting a transmitter (Tx) entity, the apparatus comprising:
    a transmitter;
    a receiver; and
    a controller to:
        initiate transmission, via the transmitter, of an initial plurality of frames to a receiver (Rx) entity, each of the initial plurality of frames comprising a header having a Tx reset indicator field set to a first state as part of a previously conducted reset operation;
        in response to receiving a reset request message from the Rx entity, the reset request message comprising a Rx reset indicator set to indicate that the Rx entity has performed a Rx entity reset operation:
            perform a Tx entity reset operation; and
            initiate transmission, via the transmitter, of a subsequent plurality of frames to the Rx entity, each of the subsequent plurality of frames having the Tx reset indicator field in the header set to a second state to indicate that the Tx entity has performed the Tx entity reset operation, wherein each of the initial plurality of frames and each of the subsequent plurality of frames further comprises data for use in one or more other operations.

21. The apparatus of claim 20, further comprising:
    a memory; and
    wherein the controller, in performing the Tx entity reset operation, resets a send state variable in the memory, and clears a retransmission buffer in the memory.

22. The apparatus of claim 21, wherein the send state variable comprises information about a sequence number of a next data unit to be sent.

23. An apparatus for use in resetting a receiver (Rx) entity, the apparatus comprising:
    a transmitter;
    a receiver; and
    a controller to:
        obtain, via the receiver, an initial plurality of frames from a transmitter (Tx) entity, each of the initial plurality of frames comprising a header having a Tx reset indicator field set to a first state as part of a previously conducted reset operation;
        in response to a determination to perform a Rx entity reset operation:
            perform an Rx entity reset operation;
            initiate transmission of a reset request message to the Tx entity via the transmitter, the reset request message comprising a Rx reset indicator set to indicate that the Rx entity has performed the Rx entity reset operation; and
        obtain, via the receiver, a subsequent plurality of frames from the Tx entity, each of the subsequent plurality of frames having the Tx reset indicator field in the header set to a second state indicating that the Tx entity has performed a Tx entity reset operation, wherein each of the initial plurality of frames and each of the subsequent plurality of frames further comprises data for use in one or more other operations.

24. The apparatus of claim 23, further comprising:
a memory; and
wherein the controller, in performing the Rx entity initialization procedure, resets at least two receive state variables in the memory, and clears a resequencing buffer in the memory.

25. The apparatus of claim 24, wherein the receive state variables comprise a first receive state variable providing information indicating a sequence number of a next data unit of new data expected to arrive, and a second receive sate variable providing information indicating a sequence number of a first missing data unit.

26. An apparatus for use in resetting a receiver (Rx) entity, the apparatus comprising:
a transmitter;
a receiver; and
a controller to:
 obtain, via the receiver, an initial plurality of frames received from a transmitter (Tx) entity, each of the initial plurality of frames comprising a header having a Tx reset indicator field set to a first state as part of a previously conducted reset operation;
 obtain, via the receiver, a subsequent plurality of frames from the Tx entity, each of the subsequent plurality of frames comprising the header;
 in response to identifying that the Tx reset indicator field in the header of a received frame in the subsequent plurality of frames is set to a second state, wherein the second state is indicative of the Tx entity having performed a Tx entity reset operation:
  perform an Rx entity reset operation; and
  initiate transmission of a reset acknowledge message to the Tx entity via the transmitter, the reset acknowledge message comprising a Rx reset indicator set to indicate that the Rx entity has performed the Rx entity reset operation, wherein each of the initial plurality of frames and each of the subsequent plurality of frames further comprises data for use in one or more other operations.

27. The apparatus of claim 26, further comprising:
a memory; and
wherein the controller, in performing the Rx entity initialization procedure, resets at least two receive state variables in the memory, and clears a resequencing buffer in the memory.

28. The apparatus of claim 27, wherein the receive state variables comprise a first receive state variable providing information indicating a sequence number of a next data unit of new data expected to arrive, and a second receive sate variable providing information indicating a sequence number of a first missing data unit.

\* \* \* \* \*